United States Patent [19]

Wagner

[11] 4,140,266

[45] Feb. 20, 1979

[54] APPARATUS FOR THE SOLDERING TOGETHER OF PLATES OF A PLATE HEAT EXCHANGER

[75] Inventor: Norbert Wagner, Schlederloh, Fed. Rep. of Germany

[73] Assignee: Linde Aktiengesellschaft, Wiesbaden, Fed. Rep. of Germany

[21] Appl. No.: 778,460

[22] Filed: Mar. 17, 1977

[30] Foreign Application Priority Data

Mar. 19, 1976 [DE] Fed. Rep. of Germany ....... 2611832

[51] Int. Cl.² ............................................. B23K 1/04
[52] U.S. Cl. .................................... 228/183; 228/219; 228/8; 219/85 E; 266/87; 266/89; 165/32; 165/65
[58] Field of Search ................... 228/183, 219, 220, 8, 228/9; 219/85 E, 400; 13/2; 266/87, 89; 165/61, 65, 32

[56] References Cited

U.S. PATENT DOCUMENTS

| | | | |
|---|---|---|---|
| 2,282,226 | 5/1942 | Hoop | 266/87 X |
| 2,298,996 | 10/1942 | Woods | 228/183 X |
| 2,389,175 | 11/1945 | Woods | 228/183 X |
| 2,944,504 | 7/1960 | Herman et al. | 228/219 X |
| 3,517,916 | 6/1970 | Ross et al. | 266/87 |
| 3,756,489 | 9/1973 | Chartet | 219/85 E X |
| 3,816,901 | 6/1974 | Camacho et al. | 266/87 X |

*Primary Examiner*—Al Lawrence Smith
*Assistant Examiner*—K. J. Ramsey
*Attorney, Agent, or Firm*—Karl F. Ross

[57] ABSTRACT

Plates of a plate heat exchanger, defining between them a space adapted to be traversed by a heat-exchange fluid, are held together and are soldered in a chamber in which the plates are heated by passing a heating fluid, generally an inert gas, through the passages between the plates. The apparatus comprises means for heating and cooling the fluid and a temperature-monitoring device connected to the heating means for controlling the latter. Preferably the heating fluid circulation path includes a drying station.

9 Claims, 1 Drawing Figure

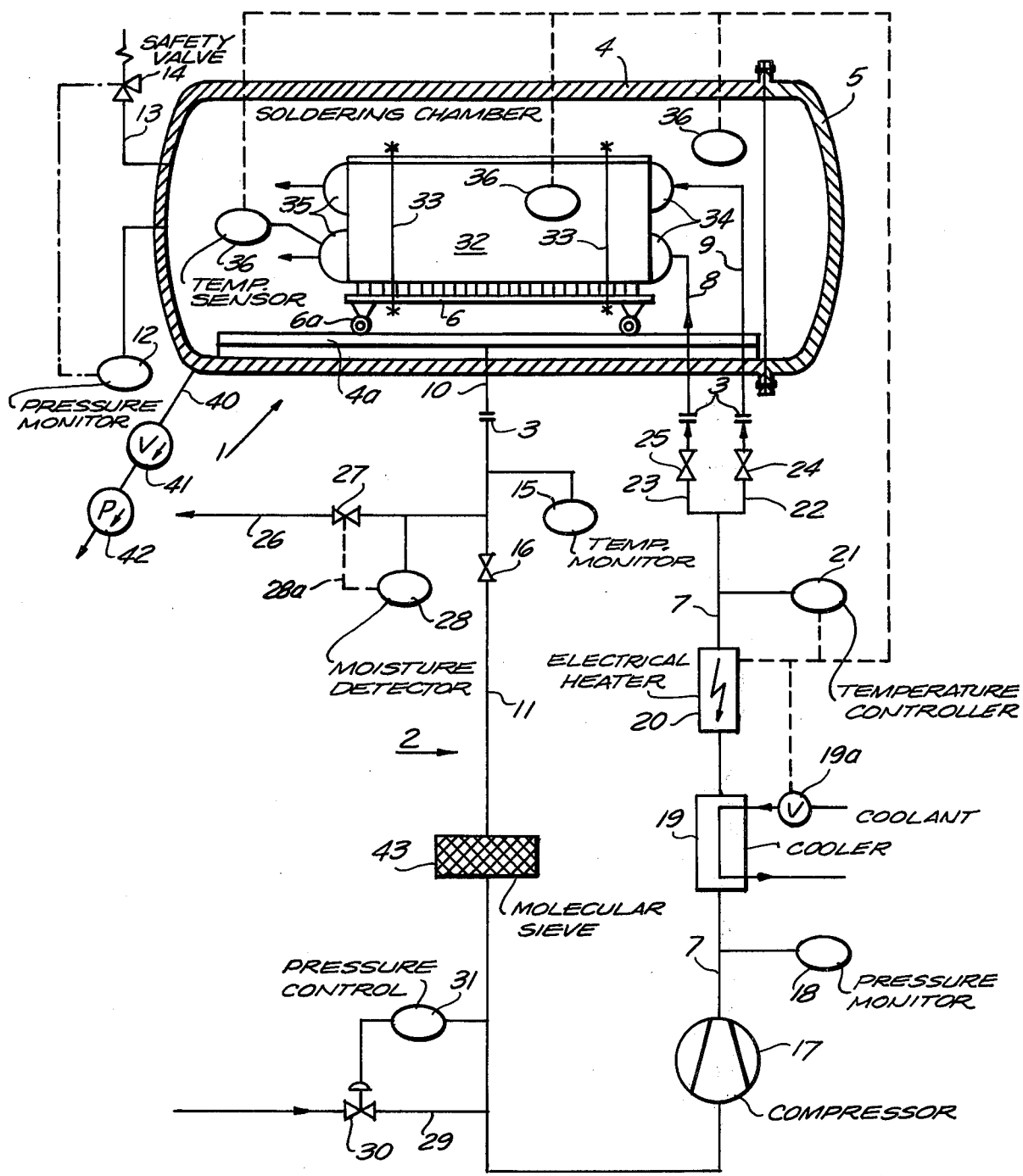

APPARATUS FOR THE SOLDERING TOGETHER OF PLATES OF A PLATE HEAT EXCHANGER

FIELD OF THE INVENTION

The present invention relates to an apparatus for the soldering of workpieces defining a space between them. More particularly, the invention relates to improvements in the soldering together of the plates of a plate heat exchanger.

BACKGROUND OF THE INVENTION

In the production of heat exchangers with plate-like elements, e.g., in the production of so-called plate heat exchangers, a stack of plates can be assembled together and soldered at their points or zones of mutual contact, generally in a furnace, oven or like chamber provided with heating means. The solder can be provided upon the contacting edges or surfaces previously and, when the plates are brought to the soldering temperature, the solder is caused to flow to bond the adjacent plates together.

A furnace for this purpose has been provided heretofore (see, for example, German open application DT-OS No. 22 54 769) and can comprise electrical heating rods or other heating elements disposed in the interior of the furnace through which a protective gas is circulated by a blower. The stack of plates to be soldered together is introduced into the furnace chamber and generally must be preheated so that the soldering temperature can be generated quickly and as uniformly as possible within the chamber.

This system has been found to have disadvantages and to require considerable work on the part of operating personnel in that, not only must the workpieces be preheated in a separate step, but the preheated pieces must be assembled together and/or the assembled stack subjected to careful preheating.

In spite of these procedures, it has been found that the heating of the plates is not uniform within the chamber and hence certain portions may not reach the soldering temperature while other portions may be overheated. In other words a uniform distribution within the workpiece stack at the soldering temperature can be attained only with difficulty in the conventional arrangement.

OBJECTS OF THE INVENTION

It is the principal object of the present invention to provide an improved apparatus for the soldering of generally flat workpieces which define spaces between them.

Another object of the invention is to provide such an improved apparatus which affords a rapid and uniform heating of a stack of workpieces in contact with one another.

Still another object is to provide an improved apparatus for the soldering of the plates of a plate-type heat exchanger together.

Still another object of this invention is to provide a system for forming a plate-type heat exchanger by soldering whereby the aforementioned disadvantages are obviated.

SUMMARY OF THE INVENTION

These objects and others which will become apparent hereinafter are attained, in accordance with the present invention, in an apparatus in which a plurality, i.e., at least two and generally a multiplicity, of plate-like elements adapted to form a plate-type heat exchanger and defining spaces between them are heated by passing a heating fluid through these spaces, i.e., through the passages which, in the finished heat exchanger, are adpated to be traversed by a heat-exchange fluid. The heating fluid is heated to a temperature sufficient to bring the workpiece stack to the soldering temperature and, most surprisingly, has been found to achieve this result in a highly uniform and rapid manner.

Thus, while workpieces defining spaces, i.e., fluid-flow passages, between them cannot be effectively heated rapidly and uniformly by conventional means, the passage of the hot fluid through the spaces has been found to achieve the desired degree of heating in a high-speed and uniform manner.

According to a feature of the invention, the heating of the workpieces is effected within a thermally insulated soldering chamber into which the heating fluid is fed and within which the heating fluid is conducted through the interior of the aforementioned spaces, i.e., through the passages defined between the adjacent plates of the stack.

The heating fluid is preferably circulated through these passages via a blower, compressor or a pump along a recirculation path along which the heating fluid can be temperature controlled, i.e., heated or cooled before it enters the passages or thereafter.

According to still another feature of the invention, the heating fluid is an inert gas and best results have seen obtained with nitrogen since the nitrogen permits a flux-less soldering of workpieces of aluminum or aluminum alloys to be carried out. The solder can be applied to the surfaces to be joined previously and, advantageously, the heating fluid traverses the passages at a rate which prevents it from entraining the flowable solder along with this fluid.

Excellent heat transfer from the inert gas to the workpieces can be obtained when the pressure of the heating fluid within the workpiece stack is elevated, i.e., a superatmospheric pressure. Because of the resulting high density of the inert gas and the more effective heat transfer from the inert gas to the metallic plates constituting the workpiece stack, the heating effect has been found to be especially uniform and can be effected at relatively low velocities of the gas. The low velocity of the inert gas is advantageous, as noted above, since it prevents, during melting of the solder, partial blowing thereof from the contacting surfaces to be soldered together.

While the invention is applicable to the soldering together of two or more workpieces defining spaces between them, it has been found to be especially advantageous in the fabrication of heat exchangers with plate-like elements. In accordance with this aspect of the invention, the heating fluid is distributed through the passages defined between two adjacent heat-exchange elements to be joined by the soldering process. The distribution of the heating gas to these passages can be effected by elements, e.g., manifolds or heads, which need not sealingly engage the workpiece stack since some leakage of the heating fluid is not disadvantageous. In other words, the manifold or distributing head can simply be pressed against the stack, the plates of which may merely be clamped together.

It is advantageous to provide, at an intermediate region within the stack of plate-like element, one or more thermal elements, e.g., thermocouples, adapted to signal the temperature continuously, thereby controlling the temperature of the heating fluid, or the attainment of the desired soldering temperature.

An apparatus of the present invention can comprise a closeable soldering chamber which can be provided with a work table, temperature-monitoring means and a circulating path along which the heating fluid can be heated and, if desired, cooled. The circulation ducts can include means for connecting this path to the soldering chamber and to distributing or manifold devices therein for feeding the heating fluid to the stack and collecting the heating fluid from the stack.

For precise control of the heat supplied to the workpiece stack, it is advantageous to provide the heating path with both a cooling device and a heater, the path also comprising blower means and temperature- and pressure-monitoring devices.

The workpieces can be especially reliably soldered under defect-free conditions when means is provided for removing residual moisture from the chamber and from the workpieces prior to the attainment of the soldering temperature. To this end, the circulating path may comprise a drying station through which the inert gas is continuously fed or fed at least until the moisture content has been reduced to a predetermined maximum level. It has been found to be especially advantageous to provide the soldering chamber with evacuating means for drawing out the gases initially present therein and thereby removing possibly detrimental traces of moisture.

According to still another feature of the invention, also designed to eliminate traces of moisture which may be detrimental, the dry inert gas is passed through the passages of the workpiece stack and the interior of the soldering chamber as a sparging gas which is released into the atmosphere until the moisture content as determined by a moisture detector at the discharge side of the chamber, has been reduced to the predetermined maximum level.

It has also been found to be most advantageous to control the temperature of the workpiece during the total soldering process automatically by regulating the cooler and the heater from the temperature-monitoring devices by providing an electrical feedback connection between the monitoring device and the temperature-regulating means, namely, the cooler and the heater.

BRIEF DESCRIPTION OF THE DRAWING

The above and other objects, features and advantages of the present invention will become more apparent from the following description, reference being made to the accompanying drawing, the sole FIGURE of which is a flow diagram illustrating an apparatus for carrying out the invention.

SPECIFIC DESCRIPTION

In the drawing I have shown an apparatus of the present invention for the soldering of a stack of workpiece plates adapted to form a plate heat exchanger upon the soldering together of these plates at their mutually contacting surfaces which define flow passages for a heat-exchange fluid between them. The plates are previously coated with solder in the conventional manner and may be composed of aluminum or an aluminum alloy.

The apparatus of the present invention comprises a soldering chamber 1 formed between a cylindrical housing 4 and a removable cover 5. The basic elements of the apparatus comprise the soldering chamber 1, a circulating path 2 for a heating fluid and connecting fittings 3 for connecting the circulating path 2 with the soldering chamber 1.

The soldering chamber comprises the aforementioned thermally insulated receptacle 4 and the thermally insulated cover 5 which can be hermatically secured to the receptacle 4. The soldering chamber 1 is provided with a removable work table 6 which can be shiftable into and out of the receptacle 4 on rails 4a provided in the receptacle, the table 6 having rollers 6a adapted to roll along these rails.

The circulating path 2 comprises an inlet or feedside 7 whereby the heating fluid is fed via lines 8 and distributing heads or manifolds 34 to the passages of the stack 32 of plates which are clamped together as represented at 33. The lines 8 and 9 feeding the distributing heads 34 are provided with valves 24 and 25 controlling the flow of fluid thereto.

The extension 10 of the return path 11 opens freely into the soldering chamber 1. A pressure-monitoring device 12 communicates with the chamber 1 to control the pressure therein, the monitoring device being connected, if desired, to a pressure-relief valve generally represented at 14 which can also serve to vent the chamber and which is, in turn, provided in a venting line 13. Should an excess of pressure develop within the chamber, the valve 14 opens to vent off the pressure excess.

In the return path 11 and the feed path 7 which form the circulation 2, there are provided in succession, a temperature-monitoring device 15, a valve 16 for controlling the proportion of recirculated fluid and discharged fluid, a blower or compressor 17, a pressure-monitoring device 18 at the discharge side of the compressor to control the latter if desired, a cooler 19 which may be supplied with a cooling fluid such as water via a valve 19a, a heater 20 which is electrically energized and a temperature-monitoring device 21.

Downstream of the heater 20 the feed line 7 is subdivided into a plurality of lines, two of which are shown at 22 and 23, respectively, corresponding in number to the distributing heads 34 and hence groups of flow passages provided in the workpiece stack 32.

Each of the lines 22, 23 has its flow cross section controllable via valves 24 and 25 so that the gas fed to the different passages of the stack 32 traverses the latter at the same flow rate.

Between the temperature-monitoring device 15 and the valve 16, a branch line 26 is provided for venting sparging gas into the atmosphere. The sparging-gas vent 26 is provided with a valve 27 whereby it may be blocked and, ahead of this valve 27, with a moisture detector 28. The latter can automatically control the valve 27 as represented by line 28a to close the valve 27 when the moisture content of the gas traversing line 26 has been reduced to the permissible maximum.

Ahead of the compressor 17, there opens into line 11 a further duct 29 which can be blocked by a valve 30 and into which is fed a dry inert gas. The valve 30 can be controlled by a pressure-monitoring device 31 responsive to the pressure in line 11.

The apparatus shown in the drawing has been found to be particularly effective for the soldering together of heat-exchanger plates of aluminum or aluminum alloy to produce a plate-type heat exchanger. The plates, as mentioned, being previously coated with the solder.

According to the invention, the solder-coated plate-like elements are assembled into the stack 32 and are clamped at 33 to the table 6 externally of the receptacle 4. The clamping means 33 can be provided with spring elements designed to increase the pressure with increasing temperature. The spring elements ensure that the stack will remain secure and tight during the soldering process.

The manifold heads or distributing elements 34 and 35, respectively at the upstream and downstream ends of the stack, are likewise pressed against the latter by clamping means of any conventional design, it being noted that a gas-tight seal is not required. The distributing heads and the ducts 8 and 9 can be made from a material which has a substantially higher melting point than that of the plate-like elements or the solder so that they are not, in turn, soldered to the stack. If the heat exchanger is to be provided with these distributing heads or manifolds, they are applied in a separate soldering operation.

The work table 6 is preferably composed of stainless steel to which the solder does not adhere.

Thermal elements, e.g., thermocouples 36, can be distributed throughout this stack and are provided at least in the central region and edge zones thereof, the elements 36 collectively forming the temperature sensor of temperature-monitoring device represented in the drawing. The temperature-sensing means 36 are connected with the temperature controller 21 which controls the valve 19a and the energization of the heater 20.

After the assembly 32 through 36 upon the table 6 is formed externally of the receptacle 4, the table 6 carrying same is rolled into the receptacle 4 and the cover 5 hermetically sealed thereto. The heating fluid, gaseous nitrogen or argon, generally in a pure and dry state, is then fed into the circulating path and the chamber 1. The heating fluid is circulated by the blower 17 and traverses the path 2. The heating fluid is continuously fed into the system through line 29, valve 16 being closed, with the fluid emerging from the chamber 1 being vented via line 26 and valve 27 until the moisture level as detected at 28 drops below the predetermined maximum, for example 50 parts/million $H_2O$. The potentially detrimental moisture residue in the chamber and the stack can be removed. To this end the chamber can be provided with a suction line 40 a check valve 41 and a suction pump 42 which is effective prior to introduction of the nitrogen or other heating fluid into the system.

In addition, the circulating line 11 can be provided with a drying station 43, e.g., containing a molecular sieve, adapted to pass the nitrogen and trap the moisture. This prevents build-up of moisture in the chamber after the heating process has commenced.

After or even during the removal of moisture, the nitrogen is heated at 20 and supplied to the stack 32 via lines 22, 23, 8, 9 and the distributing heads 34. The heated nitrogen, traversing the stack 32 and raising the temperature thereof, then passes into the interior of the chamber 1 via the manifolds 35 from which the nitrogen is drawn via outlet 10 and line 11 back along the heating path. The stack is rapidly heated to the soldering temperature, whereupon the solder melts and the adjacent plates of the stack are fused together. The temperature-control device 15, 21 of the circulating path and the thermoelements 36 in the stack ensure that the temperature of the heating fluid is sufficient to raise the temperature of the stack to the soldering temperature but does not significantly exceed this temperature. Should the temperature rise above the permissible level, the temperature-monitoring device 21 operates the cooler 19 to rapidly reduce the temperature of the gas by dissipating the sensible heat of the recirculated gas and the compression heat of the compressor 17. Thus the stack 32 is maintained within the desired temperature limits.

Because of the temperature increase, as long as nitrogen is not eliminated from the system, there is a gradual increase in pressure which can be increased still further by the supply of resh nitrogen at an elevated pressure. The pressure increase is desirable in that is improves the heat transfer to the stack at low gas velocities, the gas velocity being selected to prevent blowing of solder away from the surfaces to be fused together.

It has been found to be advantageous to gradually heat the stack to a temperature just below the melting point of the solder and then suddenly to increase the temperature of the nitrogen, for example, by about 30° C. This causes the solder to melt within the stack over a brief interval preferably of two to thirty minutes to effect the fusion. During this period the temperature is carefully monitored and the temperature of the nitrogen controlled to maintain the fusion temperature.

When the solder has completely melted, the heater 20 is deenergized and the nitrogen is cooled by cooler 19 while continuing to circulate through the stack. The quantity of nitrogen is dependent upon the mass of the stack 32 and the heat losses of the apparatus. To this end, the soldering chamber and the ducts of the circulating path are preferably insulated against the environment. While nitrogen is preferred as the inert gas, argon or other inert gases can also be used.

I claim:

1. An apparatus for soldering a stack of workpieces together, said workpieces defining passages between them and having solder at mutually contacting surfaces, said apparatus comprising:
    a hermetically sealable soldering chamber provided with a work table adapted to receive said stack;
    a circulating path for a heating fluid including
    manifold means connected to said stack at one side for feeding said fluid directly through said passages,
    at least one conduit passing through a wall of said chamber and connected with said manifold means, said passages opening into said chamber, at the opposite side of the stack, and
    means for withdrawing said fluid from said chamber;
    heating means along said path for raising the temperature of said fluid to be passed through said passages to a temperature sufficient to melt said solder; and
    temperature-sensing means in said chamber and temperature-control means along said path, said temperature-sensing means being connected to said temperature-control means for regulating the temperature of said heating fluid in accordance with the temperature of said stack.

2. The apparatus defined in claim 1 wherein said temperature-control means includes a cooler disposed along said path and a heater disposed along said path.

3. The apparatus defined in claim 2 wherein said path further comprises a blower for circulating said fluid therealong and pressure-control means for regulating the pressure of the fluid traversing said path.

4. The apparatus defined in claim 1, further comprising a drying station along said path for drying the fluid supplied to said chamber.

5. The apparatus defined in claim 1, further comprising evacuating means connected to said chamber for drawing residual moisture therefrom.

6. The apparatus defined in claim 1 wherein said path is provided with a discharge line for venting moisture-containing fluid from said path, and a moisture detector responsive to the moisture content of said fluid for controlling the flow of fluid through said line.

7. The apparatus defined in claim 1 wherein said temperature-control means is electrically connected to said temperature-sensing means in a feedback path.

8. An apparatus for soldering a stack of workpieces together, said workpieces defining passages between them and having solder at mutually contacting surfaces, said apparatus comprising:
- a hermetically sealable soldering chamber provided with a work table adapted to receive said stack;
- a circulating path for a heating fluid connected to said chamber and including means for feeding said fluid directly through said passages;
- heating means along said path for raising the temperature of said fluid to be passed through said passages to a temperature sufficient to melt said solder;
- temperature-sensing means in said chamber and temperature-control means along said path, said temperature-sensing means being connected to said temperature-control means for regulating the temperature of said heating fluid in accordance with the temperature of said said stack;
- means for removably supporting said table in said chamber, said path comprising, in succession,
- a discharge line opening freely into said chamber for drawing recirculated fluid therefrom,
- a valve disposed along said path downstream of said discharge line,
- a compressor downstream of said valve,
- an electrically energized heater and
- a cooling heat exchanger downstream of said compressor; and
- distributing means downstream of said heater for distributing the heated fluid into said passages, said passages opening into the interior of said chamber to discharge the fluid traversing said passages into the latter.

9. The apparatus defined in claim 8 further comprising press-monitoring means connected to said chamber for controlling the pressure therein, a relief valve connected to said chamber for venting same upon the development of an excess pressure in said chamber, a cover on said chamber hermetically sealed thereto and removable to enable withdrawal of said table therefrom, evacuating means connected to said chamber for evacuating same to remove traces of moisture therefrom, a molecular sieve along said path for drawing the heating fluid traversing same, means along said path for feeding fresh dry heating fluid thereto ahead of said compressor, and means upstream of said compressor for discharging moisture-containing fluid from said path, the latter means being provided with a moisture detector responsive to the moisture of fluid withdrawn from said chamber.

* * * * *